(12) United States Patent
Gehrke et al.

(10) Patent No.: US 10,761,493 B2
(45) Date of Patent: Sep. 1, 2020

(54) SAFETY MODULE FOR AN AUTOMATION SYSTEM, AUTOMATION SYSTEM AND METHOD FOR OPERATING A SAFETY MODULE IN AN AUTOMATION SYSTEM

(71) Applicant: Festo SE & Co. KG, Esslingen (DE)

(72) Inventors: Martin Gehrke, Weinstadt (DE); Roland Kalberer, Kirchheim (DE); Ralf Forcht, Wendlingen (DE)

(73) Assignee: FESTO SE & CO. KG, Esslingen (DE)

( * ) Notice: Subject to any disclaimer, the term of this patent is extended or adjusted under 35 U.S.C. 154(b) by 150 days.

(21) Appl. No.: 15/816,320

(22) Filed: Nov. 17, 2017

(65) Prior Publication Data

US 2018/0143594 A1 May 24, 2018

(30) Foreign Application Priority Data

Nov. 21, 2016 (DE) .......................... 10 2016 222 940

(51) Int. Cl.
*G05B 9/02* (2006.01)
*F15B 13/08* (2006.01)
*F15B 20/00* (2006.01)

(52) U.S. Cl.
CPC .............. *G05B 9/02* (2013.01); *F15B 13/085* (2013.01); *F15B 13/086* (2013.01);
(Continued)

(58) Field of Classification Search
CPC ... G05B 9/02; F15B 20/00; Y10T 137/87885; Y10T 137/8376; Y10T 137/8225; F16K 37/0083

See application file for complete search history.

(56) References Cited

U.S. PATENT DOCUMENTS

| 2004/0199364 A1* | 10/2004 | Law | G05B 23/0256 |
| | | | 702/189 |
| 2008/0225457 A1* | 9/2008 | Korrek | H01H 51/005 |
| | | | 361/100 |

(Continued)

FOREIGN PATENT DOCUMENTS

| DE | 102007020597 | 1/2009 |
| EP | 2026156 | 2/2009 |

*Primary Examiner* — Hongmin Fan

(74) *Attorney, Agent, or Firm* — Hoffmann & Baron, LLP

(57) ABSTRACT

A safety module for an automation system includes a communication interface designed for a signal-transmitting connection to a communication system, an output interface designed for a signal-transmitting connection to at least one user which can be fitted downstream and a processing device connected to the communication interface and the output interface and designed to process communication signals from the communication interface and to provide output signals to the output interface wherein the processing device is designed for a detection of an actual component behaviour, using a control command contained in a communication signal and a component measured value contained in a communication signal, and for a comparison of a presettable component behaviour to the actual component behaviour as well as for a provision of a safety-oriented output signal to the output interface at a presettable divergence between the presettable component behaviour and the actual component behaviour.

10 Claims, 2 Drawing Sheets

(52) U.S. Cl.
CPC ....... *F15B 13/0839* (2013.01); *F15B 13/0846* (2013.01); *F15B 13/0867* (2013.01); *F15B 13/0896* (2013.01); *F15B 20/00* (2013.01); *F15B 2211/6336* (2013.01); *F15B 2211/8755* (2013.01)

(56) References Cited

U.S. PATENT DOCUMENTS

| | | |
|---|---|---|
| 2009/0045363 A1 | 2/2009 | Kremser et al. |
| 2010/0089473 A1 | 4/2010 | Grein et al. |
| 2011/0178611 A1* | 7/2011 | Daraiseh .................. G05B 9/02 700/80 |
| 2012/0055329 A1* | 3/2012 | Heer ..................... F15B 20/002 91/403 |
| 2015/0069280 A1* | 3/2015 | Bennek .................. H01F 7/127 251/129.15 |
| 2018/0307187 A1* | 10/2018 | Scholz .................... G05B 9/03 |
| 2018/0364670 A1* | 12/2018 | Dotson .................. H01H 19/64 |
| 2019/0212708 A1* | 7/2019 | Kojima ................ G05B 19/418 |

\* cited by examiner

SAFETY MODULE FOR AN AUTOMATION SYSTEM, AUTOMATION SYSTEM AND METHOD FOR OPERATING A SAFETY MODULE IN AN AUTOMATION SYSTEM

BACKGROUND OF THE INVENTION

The invention relates to a safety module for an automation system, the module comprising a communication interface designed for a signal-transmitting connection to a communication system, an output interface designed for a signal-transmitting connection to at least one user which can be fitted downstream and a processing device connected to the communication interface and the output interface and designed to process communication signals from the communication interface and to provide output signals to the output interface. The invention further relates to an automation system for operating at least one actuator and to a method for operating a safety module in an automation system.

The applicant distributes a safety module with the name of CPX-FVDA-P, which is designed for a communication with a higher-order safety-oriented control unit and which facilitates a safety-oriented influencing of users which can be fitted downstream. In this, we have to start from the fact that within current safety standards there is a need for a knowledge of the safety module concerning the users which can be fitted downstream, wherein relevant data of these users are, for example, directly input into the safety module with a suitable input device.

SUMMARY OF THE INVENTION

The invention is based on the problem of providing a safety module, an automation system and a method for operating a safety module in an automation system, wherein a simplified configuration of the safety module is ensured.

For a safety module of the type referred to above, this problem is solved by a safety module for an automation system, the module comprising a communication interface designed for a signal-transmitting connection to a communication system, an output interface designed for a signal-transmitting connection to at least one user which can be fitted downstream and a processing device connected to the communication interface and the output interface and designed to process communication signals from the communication interface and to provide output signals to the output interface, wherein it is provided that the processing device is designed for a detection of an actual component behaviour, using a control command contained in a communication signal and a component measured value contained in a communication signal, and for a comparison of a presettable component behaviour to the actual component behaviour as well as for a provision of a safety-oriented output signal to the output interface at a presettable divergence between the presettable component behaviour and the actual component behaviour.

The safety module is designed for placement between components of a lower-order control unit, which is, for example, designed for the control of a sub-function region of a complex machine. It may, for example, be provided that such a lower-order control unit is used for controlling a work manipulator in a machining cell, e.g. of a milling machine. The lower-order control unit, for example, comprises a bus node for communication with a higher-order control unit, which may in particular be designed as a programmable logic controller (PLC) and can be used for the control of several sub-function regions of the complex machine. The lower-order control unit further comprises a safety module connected to the bus node via an internal communication system, e.g. a proprietary bus system, for processing control signals of the higher-order control unit. In addition, the lower-order control unit comprises a plurality of functional modules, of which at least one is designed as an input module or as a combined input/output module and of which at least one further is designed as an actuator controller, e.g. as a solenoid valve for influencing a fluid flow for a fluid user.

The actuator controller is preferably designed as a safety-oriented functional module with characteristics in accordance with a presettable safety level. A safety-oriented functional module designed for blocking or enabling a fluid flow as a function of an output signal of the safety module will, for example, comprise an interconnection of several solenoid valves. Both in electric and in pneumatic terms, these solenoid valves are designed such that, for example at the non-appearance of the presettable electric output signal, a reliable blocking of a fluidic connection between a fluid source and an actuator connected to the safety-oriented functional module is ensured in order to move the actuator into a safe state by energy discharge.

The safety module is provided for the targeted activation of at least one, in particular safety-oriented, functional module and has to meet the requirements of the sought-for safety level within the preset safety category. A further aim is a largely independent function for the safety module. A particular aim is to limit a communication of the safety module with a safety control unit, which is a part of the higher-order control unit in particular, to a minimum. For this purpose, it is provided that the safety module independently makes decisions for a safety-oriented operation of at least one functional module of the lower-order control unit, which comprises the safety module and the at least one, in particular safety-oriented, functional module, without requiring any communication with the safety control unit, in particular by means of the higher-order control unit.

In order to achieve this independence of the safety module without having to perform a complex user-side configuration, it is provided that the safety module is configured with the aid of a configuration system of the higher-order control unit, which is also described as an engineering system. In the configuration process, at least one link of the safety module to at least one sensor assigned to an actuator to be controlled by the safety module is defined. In the lower-order control unit it is, for example, provided that sensor signals of a sensor are coupled in at an input module or a combined input/output module and there made available to the bus node via the internal communication system. The bus node is in turn designed to transfer incoming sensor signals to the safety module as component measured values within communication signals for use in a comparison to a presettable component behaviour. Here it is provided that the safety module is made aware by the configuration relayed by the higher-order control unit, in particular during a starting phase of the automation system, by means of at least one of the parameters contained in the configuration, from which input of the input module or the combined input/output module a component measured value is to be expected. A transmission of the configuration and the at least one parameter contained therein from the higher-order control unit via the bus system to the safety module does not have to meet any special safety targets, because it can be assumed that in the case of a faulty transmission the safety module will not undertake a correct assignment between incoming component measured values and the preset component behaviour. Accordingly, any malfunction will be uncovered even at a first provision of an output signal to the associated actuator controller, in particular at a validation of the function of the lower-order control unit at the commissioning of the automation system, which is not yet subject to normal operating conditions.

If an actuator controller connected to the safety module is activated by a control signal converted into an output signal by the safety module, the safety module is, owing to the parameterisation performed in the starting phase, configured to expect a component measured value which reflects a correct reaction of the actuator supplied with energy by the actuator controller. If this component measured value, which may for example be a sensor signal representing the arrival of the actuator at a presettable end position, arrives within a preset period of time, in particular within 60 seconds, after the provision of the respective output signal, the safety module can be configured to classify this component behaviour as regular and remains in a normal operating mode in which further incoming control signals are converted into output signals for the activation of the at least one connected actuator controller. If the component measured value does not correspond to the expected component behaviour within the preset period of time, however, for example because no sensor signal representing an expected arrival of the actuator at its end position arrives within the preset period of time, the safety module is configured to activate the actuator controller in such a way that the connected actuator is de-energised. This can, for example, be obtained by providing that a control voltage provided as an output signal of the actuator controller designed as a solenoid valve is switched off by the safety module, so that the actuator controller in turn interrupts a fluid flow to the actuator, which therefore does not move any further. Different procedures for ensuring a safe state for the actuator can be provided as well.

Advantageous further developments of the invention are the subject matter of the dependent claims.

It is expedient if the processing device is designed for a provision of an in particular safety-oriented communication signal to the communication interface in the presence of a presettable divergence between the presettable component behaviour and the actual component behaviour. The safety-oriented communication signal can inform the safety control unit that there has been a deviation from a normal operating state in the lower-order control unit, enabling the safety control unit to initiate further measures in order to set a safe state for the lower-order control unit affected or, if necessary, for all connected lower-order control units.

In an advantageous further development of the invention, it is provided that the processing device is designed for assigning the control command contained in the communication signal to the component measured value contained in the communication signal, using a parameter from a communication signal. This assignment establishes an unambiguous relationship between the component measured values received during the operation of the safety module and the control command which results in the intended action of the actuator if the safety module has been parameterised properly and if a functional chain comprising the safety module, the actuator controller activated thereby and the actuator assigned to the actuator controller functions properly. As soon as there is a malfunction in this functional chain, the safety module can detect a divergence between the actuator action intended by the control command and an actual actuator action and can then initiate the provided safety-oriented action by providing a suitable output signal.

According to a second aspect, the problem of the invention is solved by an automation system for operating at least one actuator. The automation system comprises a higher-order control unit to which are assigned a communication system and a safety control unit, as well as a lower-order control unit which is connected to the communication system and comprises a bus node, at least one input module, at least one safety module, in particular a safety module according to the invention, for the provision of operating energy to an actuator, at least one actuator connected to the safety module and at least one sensor device connected to the input module and designed for the detection of an actuator movement, wherein the bus node is designed for a conversion of communication signals of the higher-order control unit and of internal communication signals of the safety module and for a reception of component measured values from the sensor device connected to the input module and for transferring the component measured values to the safety module as a communication signal.

According to a third aspect, the problem of the invention is solved by a method for operating a safety module in an automation system. The method comprises the steps of: the provision of a communication signal from a higher-order control unit to a bus node, wherein the communication signal comprises at least one parameter describing a link between an input of an input module and an actuator, the reading-out and storage of the at least one parameter in the bus node and the transferring of the parameter to a safety module assigned to the bus node and capable of providing output signals for activating the actuator, the processing of the parameter in a processing device of the safety module in order to establish a communication link between the input of an input module, the bus node, the safety module and the actuator connected to the safety module.

Within the commissioning of the automation system, there is therefore, by means of a parameterisation contained in the configuration for the safety module, created a link both in the bus node and in the safety module, which link determines a signal flow from at least one sensor via an associated input module or input/output module to the bus node and from there to the safety module. In the parameterisation process, the bus node receives the information which sensor signal received from an input module or input/output module is to be transferred to the safety module as communication signal. In the parameterisation process, the safety module further receives the information which link is required between a control signal arriving in the subsequent normal operation of the automation system and a component measured value provided as communication signal. This link describes a relationship between a sensor signal arriving at an input of an input module and an output signal which is to be output by the processing device as a function of an incoming control signal and which is intended to lead to the activation of the actuator controller coupled to the actuator, the movement of which results in the change of the sensor signal. This establishes a circular relationship between the control signal, the safety module, the actuator controller, the actuator, the sensor mounted on the actuator, the input module connected to the sensor, the bus node and the safety module. By way of example, this circular relationship results in the maintenance of the output signal only if the safety module can determine from the actual component behaviour represented by the sensor signal, taking into account the control signal, that the actual component behaviour corresponds to a preset component behaviour. The preset component behaviour is in particular permanently and unalterably stored in the safety module.

A modification of the method provides that an input signal arriving at the input of the input module is made available to the bus node, and that the input signal is made available by the bus node to the safety module as a communication signal. The input signal is the sensor signal of the sensor which is connected to the input module and which is in turn assigned to an actuator and has the task of detecting an action of the actuator, in particular an actuator movement or an arrival at a presettable actuator position, and of making this available as a sensor signal to the input module.

A further modification of the method provides that the higher-order control unit provides the bus node with at least one control command which is transferred by the bus node to the safety module as a communication signal and converted by the processing device of the safety module into an output signal for the activation of at least one actuator, wherein the processing device performs a determination of an actual component behaviour using the control command and a signal course of the input signal made available by the input module via the bus node, and a comparison between a presettable component behaviour and the actual component behaviour, and provides a safety-oriented output signal to the output interface if there is a divergence between the presettable component behaviour and the actual component behaviour. The safety-oriented output signal is a shut-down signal in particular, by means of which the at least one actuator controller assigned to the safety module can be influenced in such a way that the connected actuator can be transferred to a safe, in particular de-energised, state. In a particularly preferred variant, it is provided that the shut-down signal serving as safety-oriented output signal causes the disconnection of a supply energy for the connected actuator controller, and that the actuator controller is designed such that it blocks a provision of energy, for example of compressed air, to the actuator if there is no supply energy.

Another modification of the method provides that the processing device makes available a safety-oriented communication signal to the communication interface for transferring to the safety control unit. In this way, the safety control unit can be informed directly that there is a problem in the respective lower-order control unit, and it can then take further measures for further operating or switching off the entire automation system in a way that meets preset safety requirements.

A further modification of the method provides that the presettable component behaviour is determined by a safety time interval and that the actual component behaviour is determined using a time interval which is measured from the provision of the output signal by the processing device to the output interface for activating the safety-oriented actuator controller to the arrival of a presettable input signal at the processing device. The presettable component behaviour is preferably permanently programmed into the safety module and cannot be changed by an operator. In a particularly preferred embodiment, the presettable component behaviour is a safety time interval of 60 seconds.

A further modification of the method provides that the safety module makes available a diagnostic signal to the communication interface if there is a divergence between the actual component behaviour and a presettable component behaviour. This diagnostic signal can be output before a detection of a presettable divergence between the presettable component behaviour and the actual component behaviour and is only used for informing the higher-order control unit. By way of example, such a diagnostic signal is output after 20 seconds, in particular to prepare any reactive measures of the higher-order control unit, which have to be taken on the arrival of the safety-oriented communication signal from the safety module.

BRIEF DESCRIPTION OF THE DRAWINGS

An advantageous embodiment of the invention is shown in the drawing, of which.

DETAILED DESCRIPTION

Figure 1:
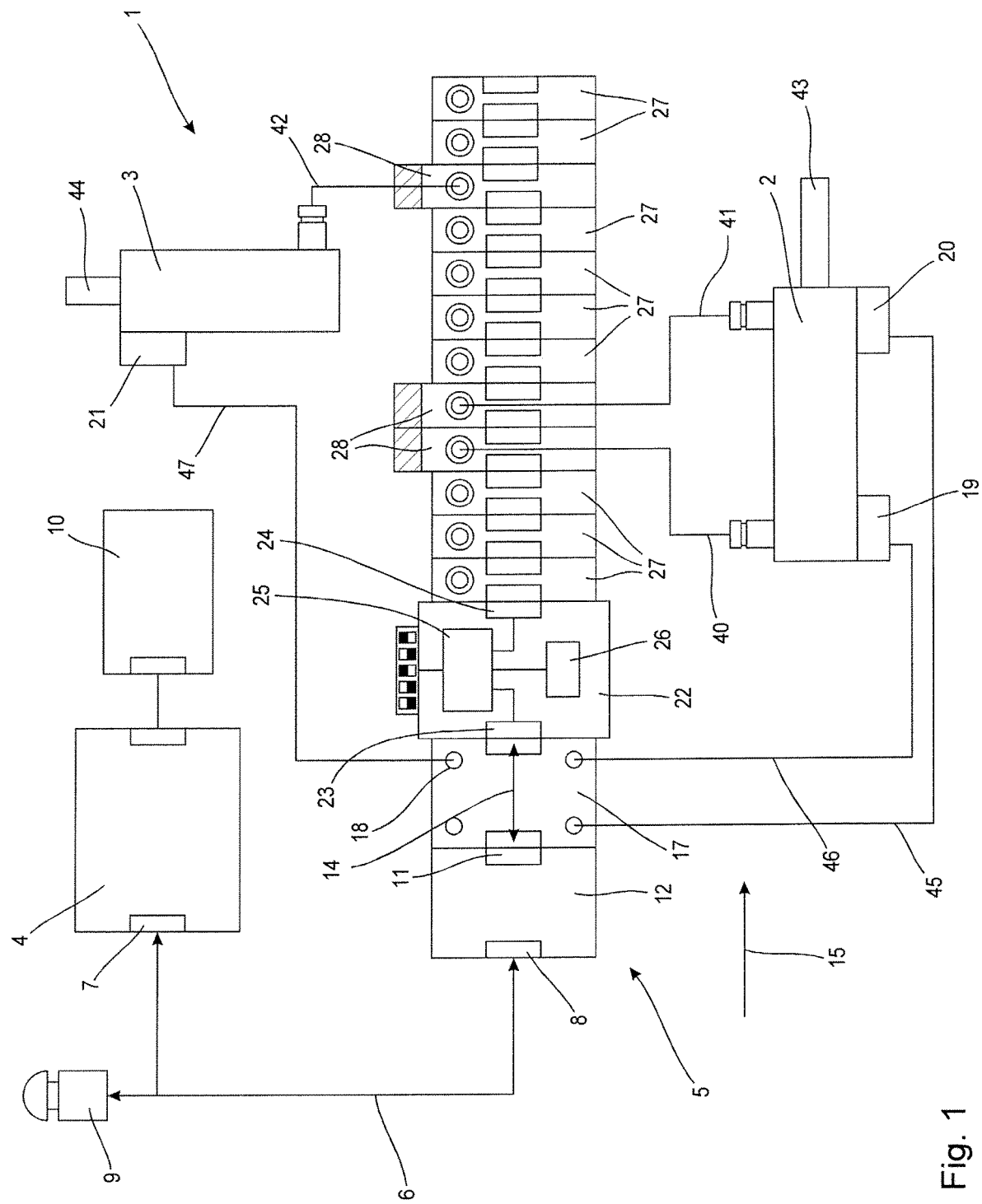
FIG. 1 is a diagrammatic representation of an automation system for the safety-oriented activation of at least one safety component.

An automation system 1 shown diagrammatically in FIG. 1 is used for operating several actuators 2, 3, which are designed as pneumatic cylinders purely by way of example and the movements of which may pose dangers, particularly for an operator not shown in the drawing. For this reason, the automation system 1 is fitted with at least one safety-oriented component to be described in greater detail below for a safety-oriented operation.

Purely by way of example, it is assumed that the automation system 1 comprises a higher-order control unit 4, which is designed as a programmable logic controller (PLC) for communication with and for influencing a plurality of bus subscribers, in particular a lower-order control unit 5 and components connected thereto and described in greater detail below. For the communication between the higher-order control unit 4 and the lower-order control unit 5, an external bus system 6 is provided which is connected to the higher-order control unit 4 by a bus interface 7 and to the lower-order control unit 5 by a bus interface 8. In addition to the lower-order control unit 5, which is also described as a bus subscriber, the external bus system 6 furthermore supports a pushbutton 9 as a further bus subscriber, whereby an emergency stop of the actuators 2, 3 operated by the automation system 1 can be initiated with the interposition of the lower-order control unit 5.

To ensure a safety-oriented shut-down of the actuators 2, 3, e.g. on operation of the pushbutton 9, the higher-order control unit 4 is assigned a safety control unit 10, via which both a safety-oriented communication with the pushbutton 9 and a safety-oriented communication with the lower-order control unit 5 via the external bus system 6 and the interposed higher-order control unit 4 are ensured. The processes provided in the safety control unit 10, the higher-order control unit 4 and the lower-order control unit 5 are described in greater detail below.

Purely by way of example, the lower-order control unit 5 is constructed in a modular fashion from a plurality of components which communicate with one another by means of an in particular proprietary internal communication system 14, which for reasons of clarity is shown in only one of the components of the lower-order control unit 5. For communicating by means of the internal communication system 14, each of the components has a mutually assigned communication interface. For coupling the internal communication system 14 to the external bus system 6 provided by the higher-order control unit 4, the lower-order control unit 5 comprises the bus node 12, which is designed for a bidirectional conversion of signals between the external bus system 6 and the internal communication system 14 of the lower-order control unit 5.

In the line-up direction 15, which runs to the right purely by way of example according to FIG. 1, the bus node 12 is adjoined by an input module 17 with several inputs 18, which are for example provided for connecting sensor lines 45, 46, 47 of sensors 19, 20, 21. The input module 17 is designed for detecting and pre-processing sensor signals of the sensors 19 to 21. The input module 17 is configured in such a way that pre-processed sensor signals of the sensors 19 to 21 are made available to the bus node 12 via the internal communication system 14, from where they can, for example, be conveyed to the higher-order control unit 4.

The input module 17 is adjoined by a safety module 22, which comprises a communication interface 23, an output interface 24, a processing device 25 and a storage device 26. Purely by way of example, the communication interface 23 is designed for a bidirectional communication with the bus node 12 via the communication system. The output interface 24 is designed for a provision of electric output signals to the downstream functional modules.

The processing device 25 is preferably designed as a microprocessor and provided for executing a presettable programme, in particular a software. In the production or configuration process of the safety module 22 in particular, this programme can be stored in the storage device 26 and from there read out by the processing device 25 for the operation of the safety module 22.

Purely by way of example, the safety module 22 is adjoined by a plurality of functional modules designed as valves 27 and safety-oriented valves 28. Each of the valves 27, 28 is designed for the provision of a fluid flow to an associated fluid user 2, 3 via fluid lines 40, 41, 42. For reasons of clarity, only the safety-oriented valves 28 are connected to the associated fluid users, i.e. the actuators 2 and 3. The valves 27, 28 are designed as solenoid or piezoelectric valves for example and are switched on or off by the safety module by providing electric energy in the form of output signals, or they are operated as proportional valves in freely selectable intermediate positions.

Purely by way of example, the safety-oriented valves 28 are in fluidic terms designed in accordance with the requirements of a safety category required for the automation system 1. As an example, it is provided that each of the safety-oriented valves comprises an internal series circuit of two monostable solenoid valves not shown in the drawing, so that a fluid flow can be enabled by the respective safety-oriented valve 28 only if both internal solenoid valves simultaneously enable the associated fluid passage in the presence of a suitable output signal of the safety module 22. The safety-oriented valves 28 can furthermore comprise further electric or electronic measures, for example to facilitate a detection for the switching state of the respective internal solenoid valve to provide a fault message to the safety module 22 if applicable.

It is for example provided that the safety module 22 receives a safety signal from the safety control unit 10 on the operation of the pushbutton 9. This safety signal is fed into the internal communication system 14 of the lower-order control unit 5 via the higher-order control unit and the external bus system 6. By means of this safety signal, an influencing, in particular a disconnection, of an energy flow, in particular a fluid flow, to the actuators 2 and 3 is to be effected, for example.

Figure 2:
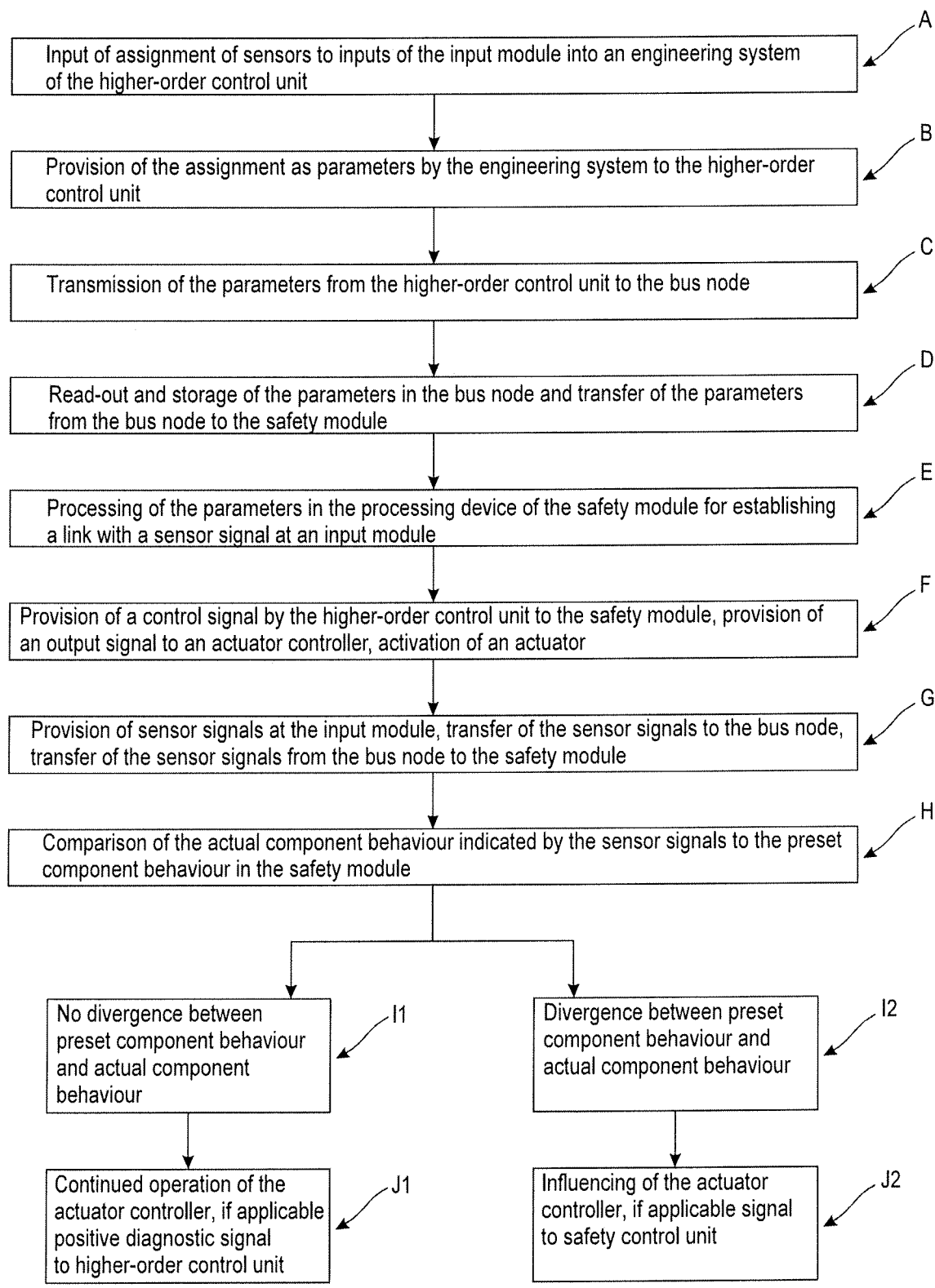
FIG. 2 is a flow diagram for an operation of a safety module.

According to the flow diagram of FIG. 2, in step A the assignment of at least one sensor 19, 20, 21 to a respective input 18 of the input module 17 is initially input into an engineering system of the higher-order control unit 4. This initially determines to which of the inputs 18 which of the sensors 19, 20, 21 are connected. Based on this information, the safety module 22 is in a following step made aware of which incoming communication signal stems from which of the actuators 2, 3 and the associated sensors 19, 20, 21. This input is preferably carried out using a computer-based graphical user interface of the engineering system not shown in detail, by means of which the higher-order control unit 4 and the lower-order control unit 5 connected thereto can be defined, configured and parameterised.

The input parameters are then transferred to the higher-order control unit 4 in step B.

During a starting phase of the automation system 1, the parameters are in step C transmitted from the higher-order control unit 4 to the bus node 12 in accordance with an external bus protocol such as PROFIBUS, in particular within a data transmission which is not especially secured.

In step D, it is provided that the bus node 12 reads the parameters out of the bus telegram transmitted via the external bus system and stores them for its own use and conveys them to the downstream safety module 22 for its use. The bus node 12 is configured for conveying input signals made available by the input module 17 to the safety module 22 and, if applicable, to the higher-order control unit 4, using the stored parameters as communication signals.

The processing device 25 of the safety module is configured for assigning the connected valves 27, 28 to the inputs 18 of the input module 17 during the starting phase of the automation system 1, using the parameters arriving in step E from the bus node 12, so that, in a subsequent normal operation of the automation system 1, the sensor signals made available by the bus node 12 as communication signals can be correctly related to the actuator controllers serving as valves 27, 28 and to the actions of the connected actuators 2, 3 as initiated by the actuator controllers 27, 28.

According to step F, a control signal is made available by the higher-order control unit 4 to the safety module 22. Here, the processing device 25 of the safety module 22 is configured for converting the control signal transmitted by the bus node as communication signal into an output signal which is made available to one of the valves 27, 28 at the output interface 24. The valve 27, 28 activated by the output signal is configured for enabling a fluid flow to the respective actuator 2, 3, so that it can initiate a movement of its piston rod 43, 44. By way of example, it is provided that the control signal effects a ventilation of a first working chamber of the actuator 2 and a venting of a second working chamber of the actuator 2, thereby moving the piston rod 43 of the actuator 2.

If the actuator 2, 3 can perform the intended movement, a sensor signal of at least one sensor 19, 20, 21 assigned to the respective actuator 2, 3 changes. This sensor signal arrives at the input 18 of the input module 17 and is transferred by the input module 17 to the bus node 12 in step G. Given the stored parameterisation, the sensor signal is there transferred to the safety module 22 as communication signal.

It is furthermore provided that, on provision of the output signal aimed at changing the movement state to the output interface 24, a chronometry is started in the safety module 22, the current value of which is continuously compared to the presettable component behaviour, which is likewise available in the form of a time interval, as indicated by step H. If the processing device 25 can detect from the signal course of at least one of the sensors 19, 20, 21 that the movement state of the actuator 2, 3 has changed and this change of the movement state has occurred within the presettable component behaviour available in the form of a time interval, which is shown in step I1, the associated actuator controller 27, 28 continues to operate in accordance with the programme running in the safety module 22, as indicated in step J1. By way of example, it is provided that the flow diagram is run through again from step F.

If the current chronometry value has exceeded the time interval according to the presettable component behaviour, a divergence between the preset component behaviour and the actual component behaviour is detected by the processing device 25 according to step I2, and consequently the provision of the output signal to the output interface 24 is blocked immediately and without any consultation with the higher-order control unit 4. In this way, the actuator 2, 3 can, by way of the selected valve 27, 28, be influenced in such a way that it adopts a safe, in particular de-energised, state as quickly as possible. If the sensor 19, 20, 21 detects a change of state in the associated actuator 2, 3 and this information is transferred via the communication path described above to the processing device 25 and the comparison to the control signal indicates that such a change of state does not correspond to the preset component behaviour, the safety module 22 can block the provision of the output signal to the output interface 24 immediately and without any consultation with the higher-order control unit 4.

It can further be provided that the safety module 22 makes available a safety-oriented communication signal to the safety control unit 10 in accordance with step J2. This informs the latter that the activated actuator 2, 3 is brought into a safe state, so that the safety control unit 10 and, if applicable, the higher-order control unit 4 can take further measures, e.g. to make the automation system 1 available for maintenance as quickly as possible and/or to inform an operator about the action of the safety module 22.

What is claimed is:

1. An automation system for operating at least one actuator, the automation system comprising:
   a higher-order control unit, to which are assigned a communication system and a safety control unit;
   a lower-order control unit, which is connected to the communication system and comprises a bus node, at least one input module, at least one safety module for a provision of operating energy to an actuator and an internal communication system connecting the bus node, the at least one input module and the at least one safety module;
   at least one actuator connected to the safety module; and
   at least one sensor device connected to the input module and designed for a detection of an actuator movement,
   wherein the bus node is designed for a conversion of communication signals of the higher-order control unit and of internal communication signals of the safety module and for a reception of component measured values from the sensor device connected to the input module and for transferring the component measured values to the safety module as a communication signal via the internal communication system of the lower-order control unit.

2. The automation system according to claim 1, wherein the at least one safety module comprises:
   a communication interface designed for a signal-transmitting connection to a communication system;
   an output interface designed for a signal-transmitting connection to at least one user which can be fitted downstream to the safety module; and
   a processing device connected to the communication interface and the output interface and designed to process communication signals from the communication interface and to provide output signals to the output interface, wherein the processing device is designed for a detection of an actual component behavior, using a control command contained in a communication signal and a component measured value contained in a communication signal, and for a comparison of a presettable component behavior to the actual component behavior as well as for a provision of a safety-oriented output signal to the output interface at a presettable divergence between the presettable component behavior and the actual component behavior.

3. The automation system according to claim 2, wherein the processing device is designed for a provision of a communication signal to the communication interface in presence of a presettable divergence between the presettable component behavior and the actual component behavior.

4. The automation system according to claim 2, wherein the processing device is designed for assigning the control command contained in the communication signal to the component measured value contained in the communication signal, using a parameter from a communication signal.

5. A method for operating a safety module in an automation system, the method comprising:
   providing a communication signal from a higher-order control unit to a bus node, wherein the communication signal comprises at least one parameter describing a link between an input of an input module and an actuator, the link determining a signal flow;
   reading-out and storage of the at least one parameter in the bus node, whereby the bus node receives the information which sensor signal received from an input module or input/output module is to be transferred to the safety module as the communication signal;
   transferring of the at least one parameter to a safety module assigned to the bus node which is capable of providing output signals for activating the actuator, whereby the safety module receives the information which link is required between a control signal arriving in the subsequent normal operation of the automation system and a component measured value provided as the communication signal; and
   processing of the parameter in a processing device of the safety module in order to establish a communication link between an input of an input module, the bus node, the safety module and the actuator which is connected to the safety module.

6. The method according to claim 5 wherein an input signal arriving at the input of the input module is made available to the bus node and wherein the input signal is made available by the bus node to the safety module as a communication signal.

7. The method according to claim 6 wherein the higher-order control unit provides at least one control command to the bus node which is transferred by the bus node to the safety module as a communication signal and which is converted by the processing device of the safety module into an output signal for the activation of at least one actuator, wherein the processing device performs a determination of an actual component behaviour using the control command and a signal course of the input signal made available by the input module via the bus node, and further performs a comparison between a presettable component behaviour and the actual component behaviour, and provides a safety-oriented output signal to the output interface if there is a divergence between the presettable component behaviour and the actual component behaviour.

8. The method according to claim 7, wherein the processing device provides a safety-oriented communication signal to the communication interface for transfer to the safety control unit.

9. The method according to claim 7, wherein the presettable component behaviour is determined by a safety time interval and wherein the actual component behaviour is determined using a time interval which is measured from the provision of the output signal by the processing device to the output interface for activating the safety-oriented actuator controller to an arrival of a presettable input signal at the processing device.

10. The method according to claim 7, wherein the safety module makes available a diagnostic signal to the communication interface if there is a divergence between the actual component behaviour and a presettable component behaviour.

* * * * *